United States Patent
Kwon et al.

(10) Patent No.: US 10,458,113 B2
(45) Date of Patent: Oct. 29, 2019

(54) BUILDING ASSEMBLY STRUCTURE (71) Applicant: LEOPLE, Inc., Nonsan-si, Chungcheongnam-do (KR)

(72) Inventors: Cheol Jin Kwon, Daejeon (KR); Ji Hye Kim, Daejeon (KR)

(73) Assignee: LEOPLE, Inc., Nonsan-si, Chungcheongnam-do (KR)

( * ) Notice: Subject to any disclaimer, the term of this patent is extended or adjusted under 35 U.S.C. 154(b) by 405 days.

(21) Appl. No.: 15/313,834

(22) PCT Filed: Jun. 29, 2015

(86) PCT No.: PCT/KR2015/006636
§ 371 (c)(1),
(2) Date: Nov. 23, 2016

(87) PCT Pub. No.: WO2015/199514
PCT Pub. Date: Dec. 30, 2015

(65) Prior Publication Data
US 2017/0191515 A1      Jul. 6, 2017

(30) Foreign Application Priority Data

Jun. 27, 2014   (KR) .......................... 10-2014-0079476

(51) Int. Cl.
*E04B 1/19* (2006.01)
*F16B 7/18* (2006.01)
(Continued)

(52) U.S. Cl.
CPC ............ *E04B 1/1906* (2013.01); *E02D 27/50* (2013.01); *E04B 1/3483* (2013.01); *F16B 7/185* (2013.01);
(Continued)

(58) Field of Classification Search
CPC ........ E04B 1/19; E04B 1/1906; E04B 1/1912; E04B 1/3483; E04B 1/58;
(Continued)

(56) References Cited

U.S. PATENT DOCUMENTS

| | | | | |
|---|---|---|---|---|
| 5,419,538 A | * | 5/1995 | Nicholas | E04F 11/1812 256/65.14 |
| 6,141,928 A | * | 11/2000 | Platt | E04F 11/1812 256/65.14 |

(Continued)

FOREIGN PATENT DOCUMENTS

| | | | | |
|---|---|---|---|---|
| DE | 1675684 B | * | 11/1969 | F16B 12/14 |
| FR | 2481387 A1 | * | 10/1981 | F16B 7/0446 |

(Continued)

*Primary Examiner* — Josh Skroupa
(74) *Attorney, Agent, or Firm* — Rabin & Berdo, P.C.

(57) ABSTRACT

A building assembly structure comprises a coupling block fixed on the ground or to a frame so as to fix and extend the frame. The coupling block comprises a body has a first through-hole passing through upper and lower portions thereof, a connection member coupled to a lower portion of the first through-hole, and having a second through-hole formed therein, a fixing plate coupled to the connection member so as to be located on the lower portion of the body, and having a fixing protrusion protruding from a side thereof, and a vibration-proof pad coupled to the upper portion of the body in order to absorb load and shocks applied from above.

7 Claims, 10 Drawing Sheets (51) Int. Cl.
*F16B 9/02* (2006.01)
*E02D 27/50* (2006.01)
*E04B 1/348* (2006.01)
*F16B 7/04* (2006.01)

(52) U.S. Cl.
CPC ........ *F16B 9/02* (2013.01); *E04B 2001/1957* (2013.01); *F16B 7/0413* (2013.01); *Y10T 403/55* (2015.01)

(58) Field of Classification Search
CPC ..... E04B 2001/1915; E04B 2001/1957; E04B 2001/196; E04B 2001/1963; E04B 2001/246; F16B 7/00; F16B 7/0406; F16B 7/0413; F16B 7/042; F16B 7/0433; F16B 7/0446; F16B 7/182; F16B 7/185; F16B 9/02; F16B 12/14; F16B 12/44; F16B 12/46; F16B 12/50; F16B 2012/145; Y10T 403/341; Y10T 403/342; Y10T 403/347; Y10T 403/348; Y10T 403/55
USPC .................... 403/170, 171, 176, 177, 292
See application file for complete search history.

(56) References Cited

U.S. PATENT DOCUMENTS

| | | | | |
|---|---|---|---|---|
| 6,669,395 | B2* | 12/2003 | Wu | F21V 21/104 403/185 |
| 6,692,180 | B2* | 2/2004 | Wu | F21V 17/04 403/292 |
| 6,726,395 | B2* | 4/2004 | Yu | F16B 7/182 403/296 |
| 6,991,397 | B2* | 1/2006 | Welch | F16B 12/04 403/292 |
| 8,707,655 | B2* | 4/2014 | Schaefer | E04C 3/06 52/710 |
| 9,458,874 | B2* | 10/2016 | Sim | E04B 1/5831 |

FOREIGN PATENT DOCUMENTS

| | | | | |
|---|---|---|---|---|
| FR | 2667656 A1 * | 4/1992 | ........... | F16B 7/0446 |
| JP | 07-173871 A | 7/1995 | | |
| JP | 09-004052 A | 1/1997 | | |
| JP | 2009-256968 A | 11/2009 | | |
| KR | 10-0631797 B1 | 10/2006 | | |
| KR | 10-2011-0023989 A | 3/2011 | | |
| WO | WO-2009060534 A1 * | 5/2009 | ............. | B25J 21/00 |
| WO | WO-2011050492 A1 * | 5/2011 | ............. | F16B 12/46 |

* cited by examiner

BUILDING ASSEMBLY STRUCTURE

TECHNICAL FIELD

The present invention relates to a building assembly structure, and more particularly to a building assembly structure capable of fixing frames of a building on the ground and of constructing the building by extending the frames.

BACKGROUND ART

In general, prefabricated buildings are used to attain a short construction period and simple construction. In order to use prefabricated buildings in desired places, a basic framework is manufactured in and transported from a factory, and is then constructed to form each of facilities such as walls and ceilings.

These prefabricated buildings are typical buildings, and are widely used to construct or extend buildings, studio apartments, efficiency apartments, simple houses, warehouses, schools, etc.

The basic framework manufactured in the factory is configured by installing columns at the respective corners of frames consisting of floor beams and ceiling beams so as to support the floor beams and ceiling beams.

Accordingly, the basic framework is manufactured and transported to an installation place for convenient construction so as to form the facilities.

In addition, as a known technique, Korean Patent Laid-open Publication No. 10-2011-0023989 discloses "A medium for connecting beams and columns of a prefabricated stackable building and a method of constructing the prefabricated building using the same".

In this document, each of beams and columns is modularized to enhance transportation efficiency, and is fixed to an end plate that is disposed horizontally on the ground while being directed outward from one side of the end plate in order to improve the convenience of assembly work.

The outer ends of the beam and the column are provided with a hollow column guard having an opening therein, and with a pair of beam plates fixed outward from the column guard in directions perpendicular to each other.

Although such a structure makes it easy to assemble the basic framework of a one-story prefabricated building, it is difficult to form a multi-story prefabricated building or expand the same by changing the design thereof.

In addition, when a multi-story building is constructed by stacking frames on a one-story basic framework, it is difficult to couple the frames to the manufactured basic framework, and hence it may require a lot of time, manpower, and equipment.

DISCLOSURE

Technical Problem

Therefore, the present invention has been made in view of the above problems, and it is an object of the present invention to provide a building assembly structure capable of easily and conveniently interconnecting frames of a building when the frames are stacked or extended.

In addition, when electric wiring, water pipes, and the like are embedded and installed inside the frames of the building, the frames can be easily interconnected even though they are designed for a multi-story structure or intended to expand an existing structure, and can be easily changed depending on the installation place.

Technical Solution

In accordance with one aspect of the present invention, the above and other objects can be accomplished by the provision of a building assembly structure using a coupling block fixed on the ground or to a frame so as to fix and extend the frame, wherein the coupling block includes a body has a first through-hole passing through upper and lower portions thereof, a connection member coupled to a lower portion of the first through-hole, and having a second through-hole formed therein, a fixing plate coupled to the connection member so as to be located on the lower portion of the body, and having a fixing protrusion protruding from a side thereof, and a vibration-proof pad coupled to the upper portion of the body in order to absorb load and shocks applied from above.

In accordance with another aspect of the present invention, there is provided a building assembly structure using a coupling block coupled to a frame having a fitting groove formed at an end thereof, so as to fix and extend the frame, wherein the coupling block includes a body inserted into the end of the frame, and having a first through-hole passing through upper and lower portions thereof, a connection member coupled to a lower portion of the first through-hole, and having a second through-hole formed therein, a fixing plate coupled to the connection member so as to be located on the lower portion of the body, and having a fixing protrusion formed on a side thereof, the fixing protrusion being coupled into the fitting groove, and a vibration-proof pad coupled to the upper portion of the body in order to absorb load and shocks applied from above, the coupling block is coupled to the frame through the fitting groove formed at the end of the frame and an elongate groove formed in a side of the frame, and the building assembly structure includes a second fixing member fixed into a fixing groove formed in a side of the body through the elongate groove so as to fix the coupling block.

The connection member may have a cut portion formed on an outer peripheral surface thereof, and the coupling block may further include a bracket installed so as to be vertically movable along the outer peripheral surface of the connection member, and protruding to an upper portion of the vibration-proof pad, a shock absorption plate coupled to an upper end of the bracket, and located on the upper portion of the vibration-proof pad, and a buffer member inserted into the cut portion so as to absorb shocks when the bracket moves vertically.

The coupling block may consist of a pair of coupling blocks that are vertically coupled to each other by a first fixing member coupled to lower portions of the respective connection members thereof.

The coupling block may consist of a pair of coupling blocks that are vertically coupled to each other by a first fixing member coupled to lower portions of the respective connection members thereof.

The coupling block may consist of a plurality of coupling blocks that are laterally coupled to each other through a coupling portion corresponding to the fixing protrusion formed on the fixing plate.

The frame may have a seating plate coupled therein, the seating plate may have a fourth through-hole formed therein, the coupling block inserted into the frame may be seated to the seating plate, and the frame may have an opening portion formed on the side thereof in order to open a lower portion of the seating plate.

Advantageous Effects

In accordance with a building assembly structure of the present invention, when a building is constructed as a multi-story building or when the frames constituting the building are extended, the frames of the building can be easily fixed. Therefore, the building can be simply constructed without the need for complicated work, and excessive time and manpower.

In addition, a body can be easily coupled to a frame by a simple method.

Furthermore, a frame can be easily stacked and accurately installed on the body which is coupled to the frame.

Finally, since a coupling block is inserted into a frame and fixes the frame to another frame, it is possible to exhibit an aesthetically pleasing exterior appearance and to arrange complicated wiring in the frame.

BEST MODE

Hereinafter, a building assembly structure according to exemplary embodiments of the present invention will be described in detail with reference to the accompanying drawings.

First Embodiment

Figure 1:
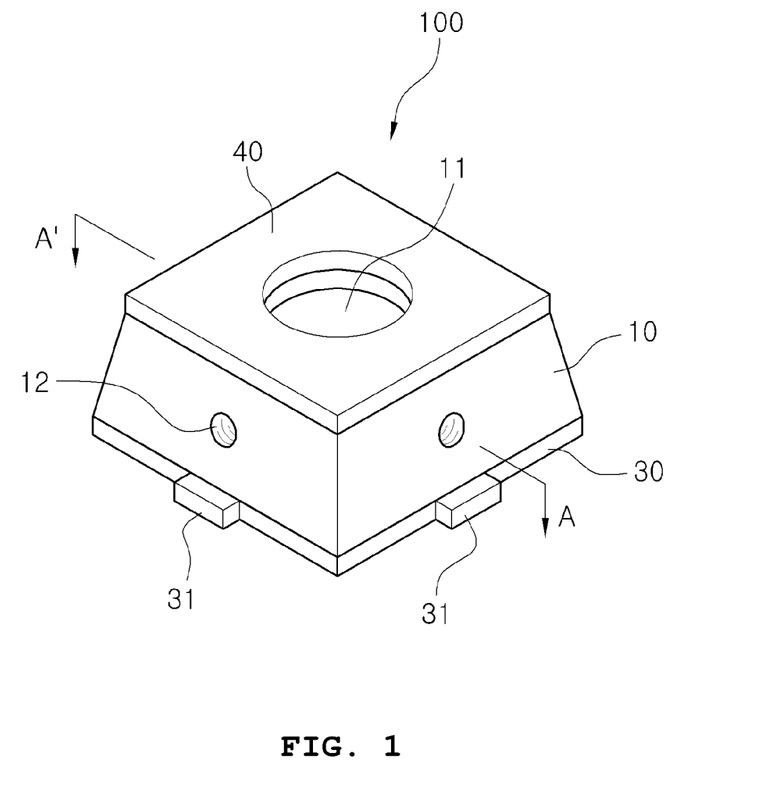
FIG. 1 is a perspective view illustrating one coupling block of a building assembly structure according to a first embodiment of the present invention.
Figure 2:
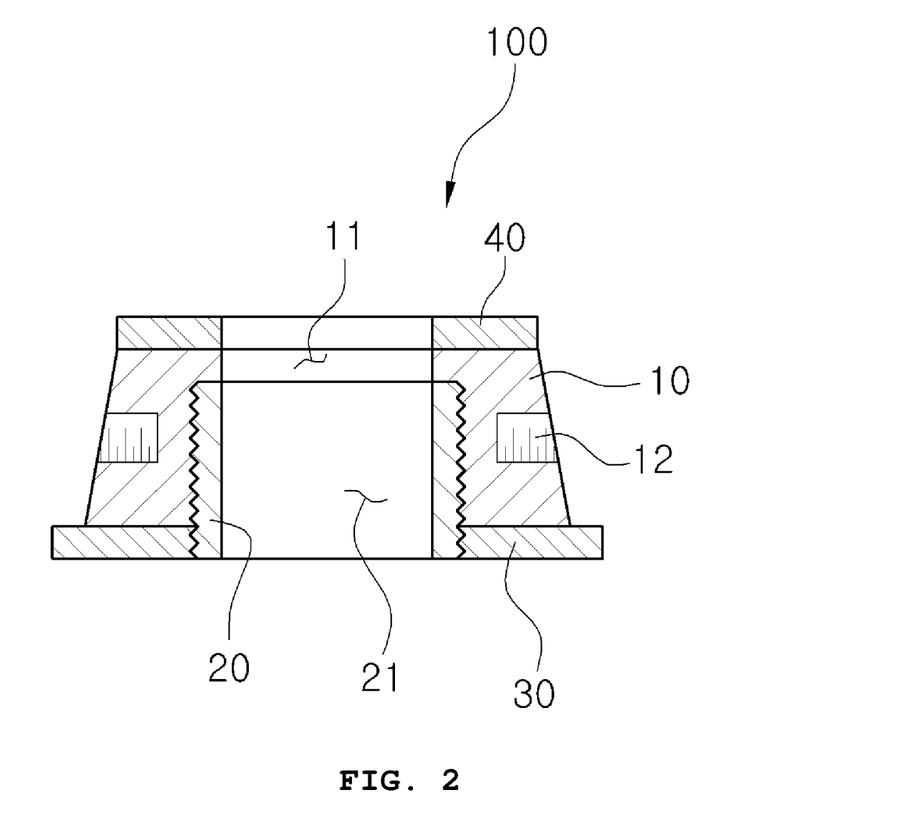
FIG. 2 is a cross-sectional view taken along line A-A' of FIG. 1.

FIG. 1 is a perspective view illustrating one coupling block of a building assembly structure according to a first embodiment of the present invention. FIG. 2 is a cross-sectional view taken along line A-A' of FIG. 1.

As illustrated in FIGS. 1 and 2, the present invention relates to a building assembly structure, and more particularly to a building assembly structure capable of fixing frames of a building on the ground and of constructing the building by extending the frames.

The building assembly structure includes a coupling block 100 so as to fix and support a frame 200 by installing, extending, and stacking the frame on the ground, and the coupling block 100 includes a body 10, a connection member 20, a fixing plate 30, and a vibration-proof pad 40, which are coupled to each other.

The body 10 is inserted into the end of the frame 200, and has a first through-hole 11 which passes through the upper and lower portions thereof.

The connection member 20 is coupled to the lower portion of the first through-hole 11 formed in the body 10, and has a second through-hole 21 formed therein.

The fixing plate 30 is coupled to the connection member 20 so as to be located on the lower portion of the body 10, and has fixing protrusions 31 that protrude from the side thereof.

Finally, the vibration-proof pad 40 is coupled to the upper portion of the body 10 in order to absorb load and shocks applied from above.

Here, the vibration-proof pad 40 may be formed such that the upper and lower portions thereof penetrate through the first through-hole 11.

That is, the fixing plate 30 is located on the lower portion of the body 10, the fixing plate 30 is coupled to the body 10 by the connection member 20, and the vibration-proof pad 40 is formed on the body 10 in order to absorb load and shocks applied from above.

A first fixing member 60 is screwed to the body 10 and the fixing plate 30 for easy coupling and decoupling, and may enable the fixing plate 30 to be easily changed and used so as to match the standard of the frame 200.

In addition, the first fixing member 60 may be formed such that the upper and lower portions thereof penetrate through the first and second through-holes 11 and 21.

Thus, wires, water pipes, and the like may be easily installed by passing them through the body 10 via the first through-hole 11.

The body 10 is tapered upward from the lower portion thereof such that the frame 200 may be easily inserted into the body 10.

Figure 3:
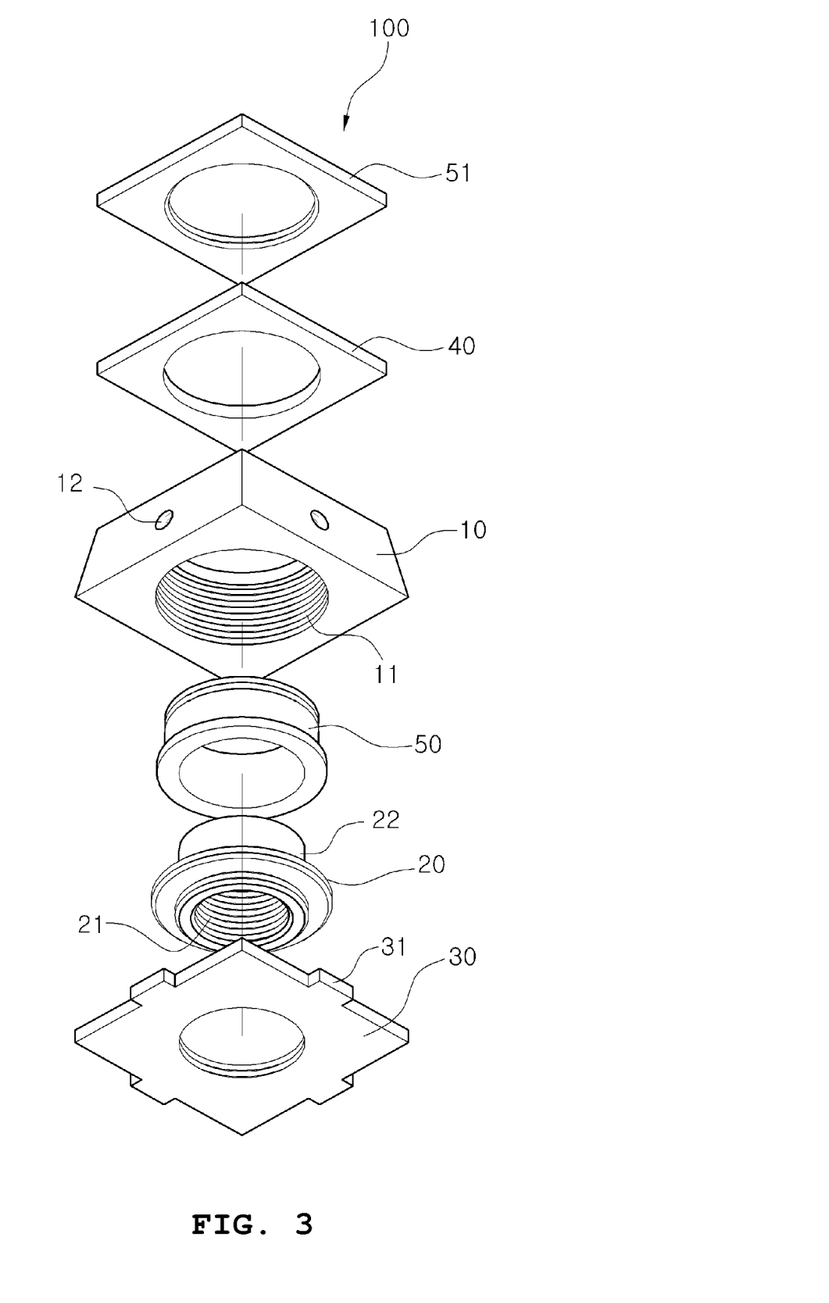
FIG. 3 is a perspective view illustrating the state in which a bracket is coupled to a shock absorption plate according to the embodiment of the present invention.
Figure 4:
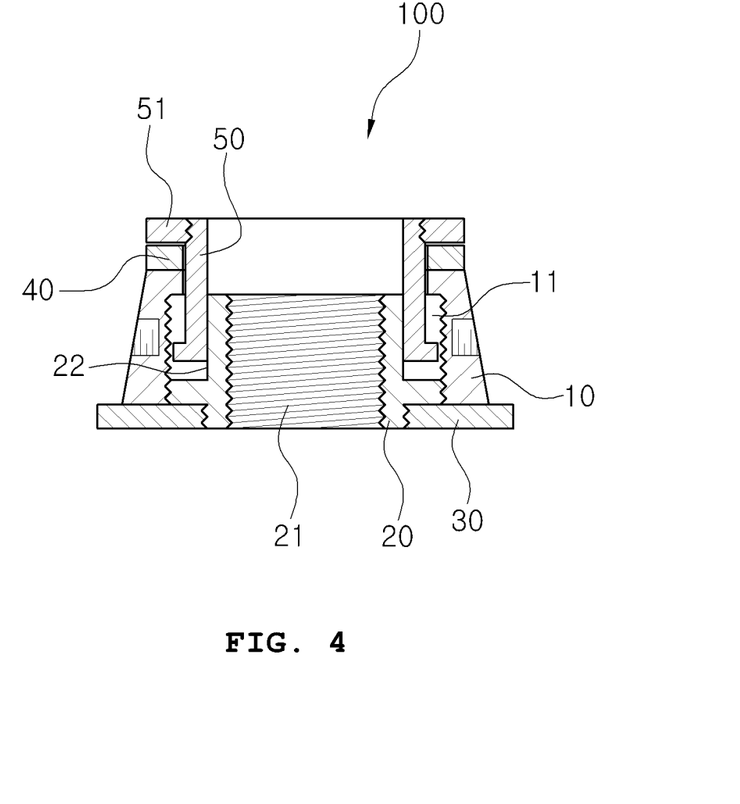
FIG. 4 is a cross-sectional view illustrating the bracket and the shock absorption plate according to the embodiment of the present invention.

FIG. 3 is a perspective view illustrating the state in which a bracket is coupled to a shock absorption plate according to the embodiment of the present invention. FIG. 4 is a cross-sectional view illustrating the bracket and the shock absorption plate according to the embodiment of the present invention.

As illustrated in FIGS. 3 and 4, the connection member 20 has a cut portion 22 formed on the outer peripheral surface thereof, and the cut portion 22 is coupled into the first through-hole 11.

The coupling block 100 includes a bracket 50 installed so as to be vertically movable along the outer peripheral surface of the connection member 20, and the bracket 50 protrudes above the vibration-proof pad 40.

Finally, the coupling block 100 includes a shock absorption plate 51 which is coupled to the upper end of the bracket 50 and which is located on the upper portion of the vibration-proof pad 40.

That is, the cut portion 22 is formed on the outer peripheral surface of the upper portion of the connection member 20 so that the bracket 50 is vertically movable. The bracket 50 vertically moves in the first through-hole 11 and on the cut portion 22.

The shock absorption plate 51, which is coupled to the bracket 50 and is located on the upper portion of the vibration-proof pad 40, absorbs strong shocks.

Preferably, the upper portion of the bracket 50 protrudes above the vibration-proof pad 40 and is coupled with the shock absorption plate 51.

In addition, the shock absorption plate 51 is screwed to the bracket 50.

Accordingly, when the bracket 50 and the shock absorption plate 51 are moved downward by load and shocks applied from above, the vibration-proof pad 40 disperses the load and shocks.

Figure 5A:
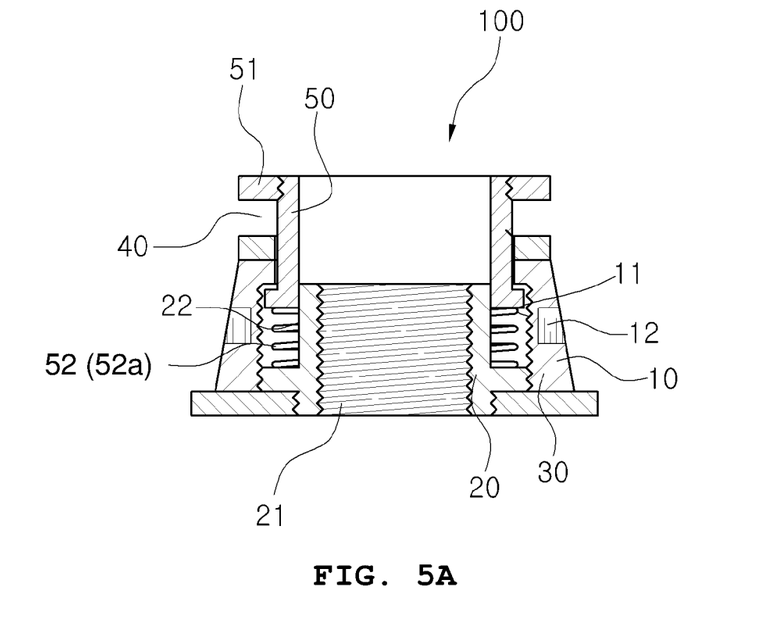
FIGS. 5A and 5B are cross-sectional views illustrating a buffer member according to the embodiment of the present invention.
Figure 5B:
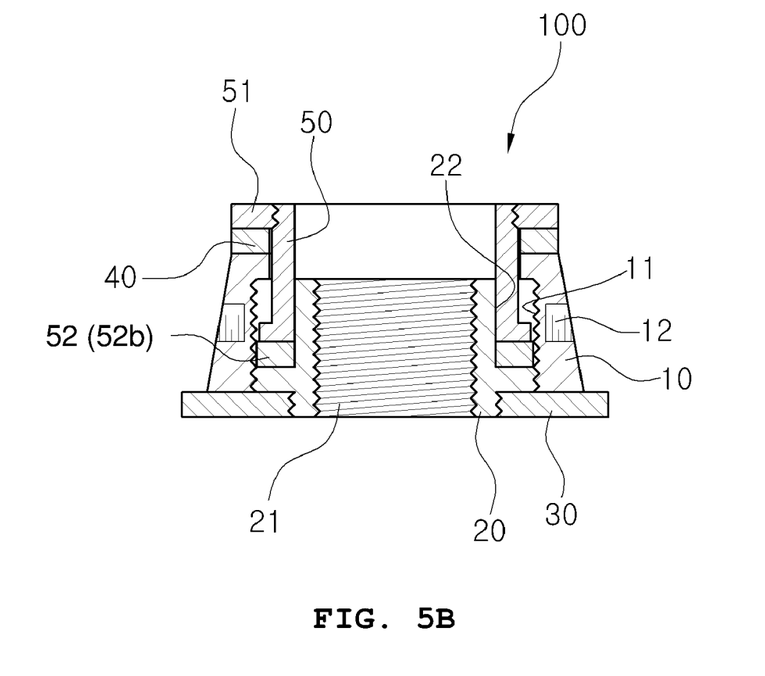

FIGS. 5A and 5B are cross-sectional views illustrating a buffer member according to the embodiment of the present invention. As illustrated in FIGS. 5A and 5B, a buffer member 52 is installed at the lower end of the cut portion 22 so as to absorb shocks when the bracket 50 moves vertically.

The buffer member 52 consists of a spring 52a or a rubber pad 52b which is installed at the lower portion of the cut portion 22 so as to absorb shocks applied when the bracket 50 moves vertically.

Here, FIG. 5A illustrates that the buffer member 52 consists of the spring 52a, and the spring 52a is connected to the lower end of the cut portion 22 and the lower end of the bracket 50 in order to prevent collisions with the bracket 50 and absorb shocks.

In addition, FIG. 5B illustrates that the buffer member 52 consists of the rubber pad 52b, and the rubber pad 52b is formed at the lower end of the cut portion 22 in order to prevent the collision with the bracket 50 and absorb shocks when the bracket 50 moves downward.

Thus, the load and shocks applied from above are transferred to the shock absorption plate 51 and the shocks are absorbed by the vibration-proof pad 40 and the buffer member 52, thereby preventing shocks from being applied to the body 10.

Figure 6A:
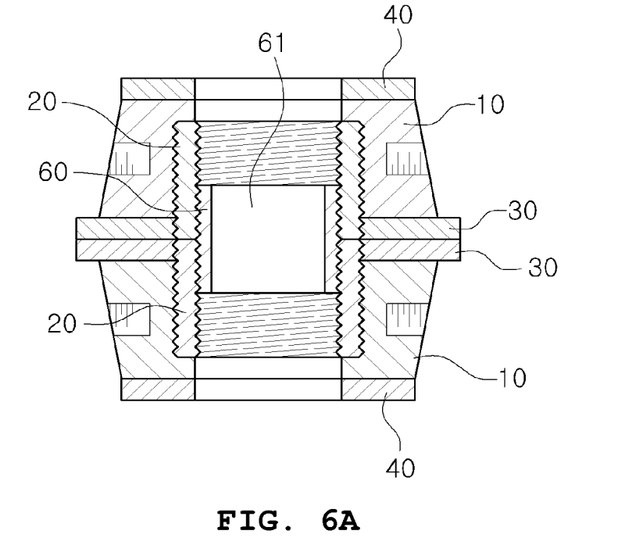
FIGS. 6A and 6B are cross-sectional views illustrating the coupling relationship of a pair of coupling blocks according to the embodiment of the present invention.
Figure 6B:
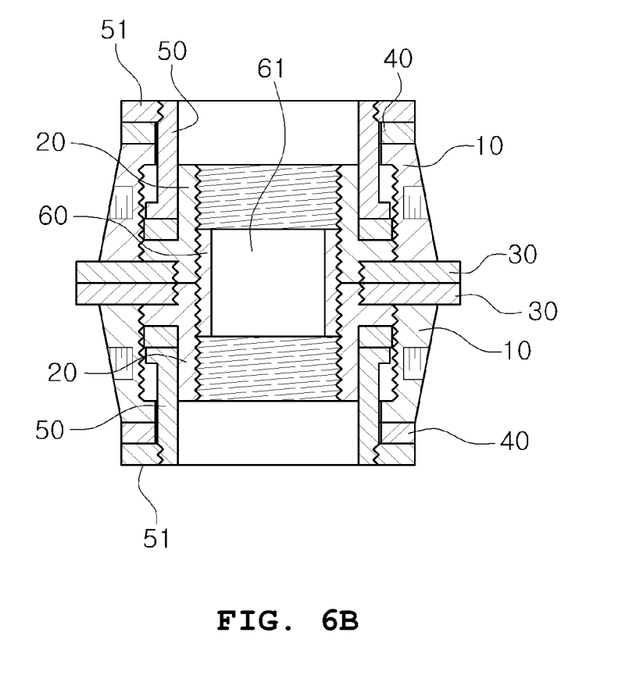

FIGS. 6A and 6B are cross-sectional views illustrating the coupling relationship of a pair of coupling blocks according to the embodiment of the present invention. As illustrated in FIGS. 6A and 6B, the coupling block 100 consists of a pair of coupling blocks which are vertically coupled to each other through the first fixing member 60 coupled to the connection members 20 of the respective coupling blocks.

Here, the first fixing member 60 is coupled to the connection members 20 coupled to the respective bodies 10 so that the lower portions of the fixing plates 30 are coupled so as to come into contact with each other, thereby forming the pair of coupling blocks 100.

As illustrated in FIGS. 6A and 6B, the connection members 20 are respectively screwed to the upper and lower portions of the first fixing member 60, thereby forming the pair of coupling blocks 100 which are vertically coupled to each other.

The first fixing member 60 is screwed into the second through-holes 21 formed in the connection members 20, and has a third through-hole 61 formed therein. The third through-hole 61 is formed so as to pass through the upper and lower portions of the pair of coupling blocks 100.

Accordingly, the first fixing member 60 allows the coupling blocks 100 to be vertically paired with each other, and prevents load and shocks from being transferred to the frames 200 by absorbing the load and shocks when the frames 200 are inserted into the pair of coupling blocks 100 from above and below.

Figure 7A:
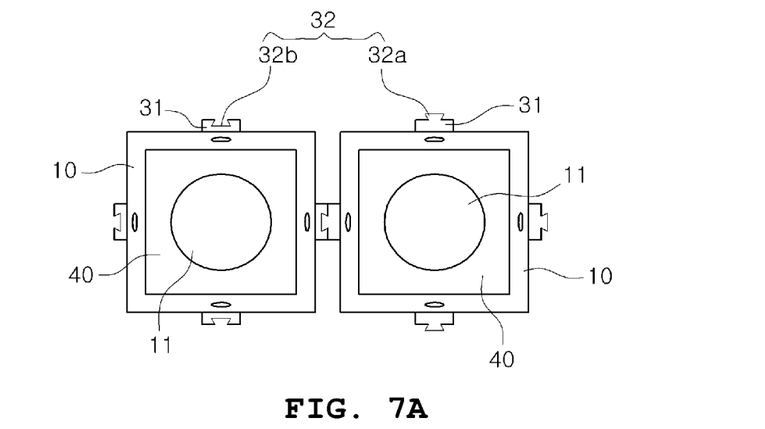
FIGS. 7A, 7B, and 7C are top views illustrating the coupling relationship of the coupling blocks which are laterally coupled to each other according to the embodiment of the present invention.
Figure 7B:
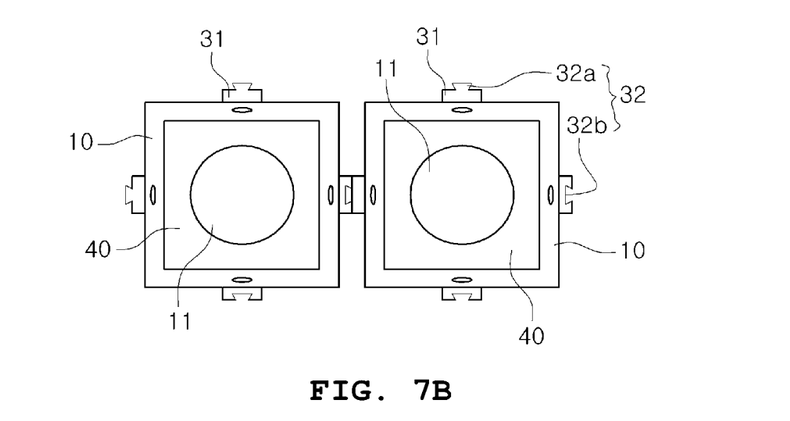
Figure 7C:
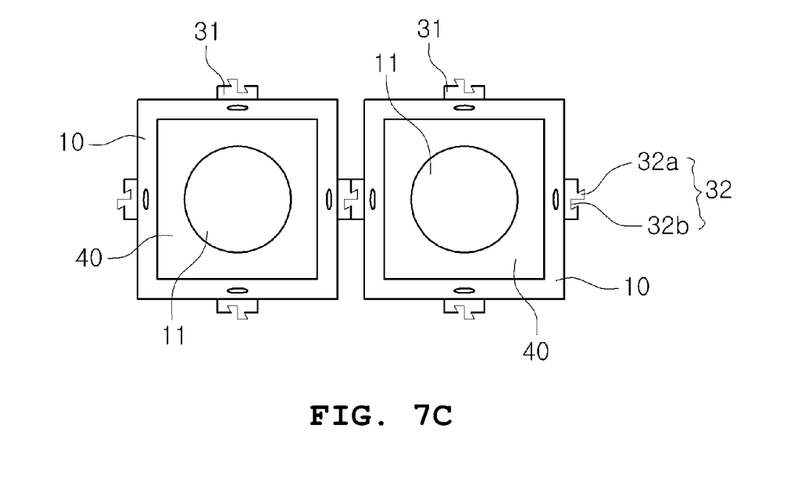

FIGS. 7A, 7B and 7C are top views illustrating the coupling relationship of the coupling blocks which are laterally coupled to each other according to the embodiment of the present invention. As illustrated in FIGS. 7A, 7B and 7C, the coupling block 100 consists of a plurality of coupling blocks which are laterally coupled to each other through coupling portions 32 corresponding to the fixing protrusions 31.

Here, each of the coupling portions 32 may have various shapes such that the coupling blocks 100 are laterally coupled to each other.

For example, as illustrated in FIGS. 7A, 7B and 7C, the coupling portion 32 formed on the outer surface of the corresponding fixing protrusion 31 consists of an uneven protrusion 32a or an uneven groove 32b, thereby enabling the coupling blocks 100 to be laterally coupled.

Here, as illustrated in FIG. 7A, each of the fixing protrusions 31 consists of an uneven protrusion 32a or an uneven groove 32b.

Accordingly, when the coupling portion 32 consists of the uneven groove 32b, the body 10 to be coupled thereto is formed with the uneven protrusion 32a so that the uneven protrusion 32a is coupled to the uneven groove 32b.

As illustrated in FIG. 7B, the fixing protrusions 31 formed on the body 10 regularly consist of uneven protrusions and grooves 32a and 32b.

Accordingly, one coupling portion 32 consisting of an uneven protrusion or groove 32a or 32b is coupled to another coupling portion 32 consisting of an uneven groove or protrusion 32b or 32a corresponding thereto.

As illustrated in FIG. 7C, each of the fixing protrusions 31 formed on the coupling block 100 is formed with an uneven protrusion 32a and an uneven groove 32b, and the uneven protrusion and groove 32a and 32b formed in one fixing protrusion 31 correspond to the uneven groove and protrusion 32b and 32a formed in another fixing protrusion 31.

Accordingly, the coupling blocks 100 are coupled to each other through the corresponding uneven protrusions and grooves 32a and 32b.

Although the present embodiment describes the coupling blocks 100 that are laterally coupled to each other by the coupling portions consisting of the uneven protrusions and grooves 32a and 32b, the coupling blocks 100 may be coupled to each other by various coupling methods such as screwing, fitting, and riveting.

Figure 8:
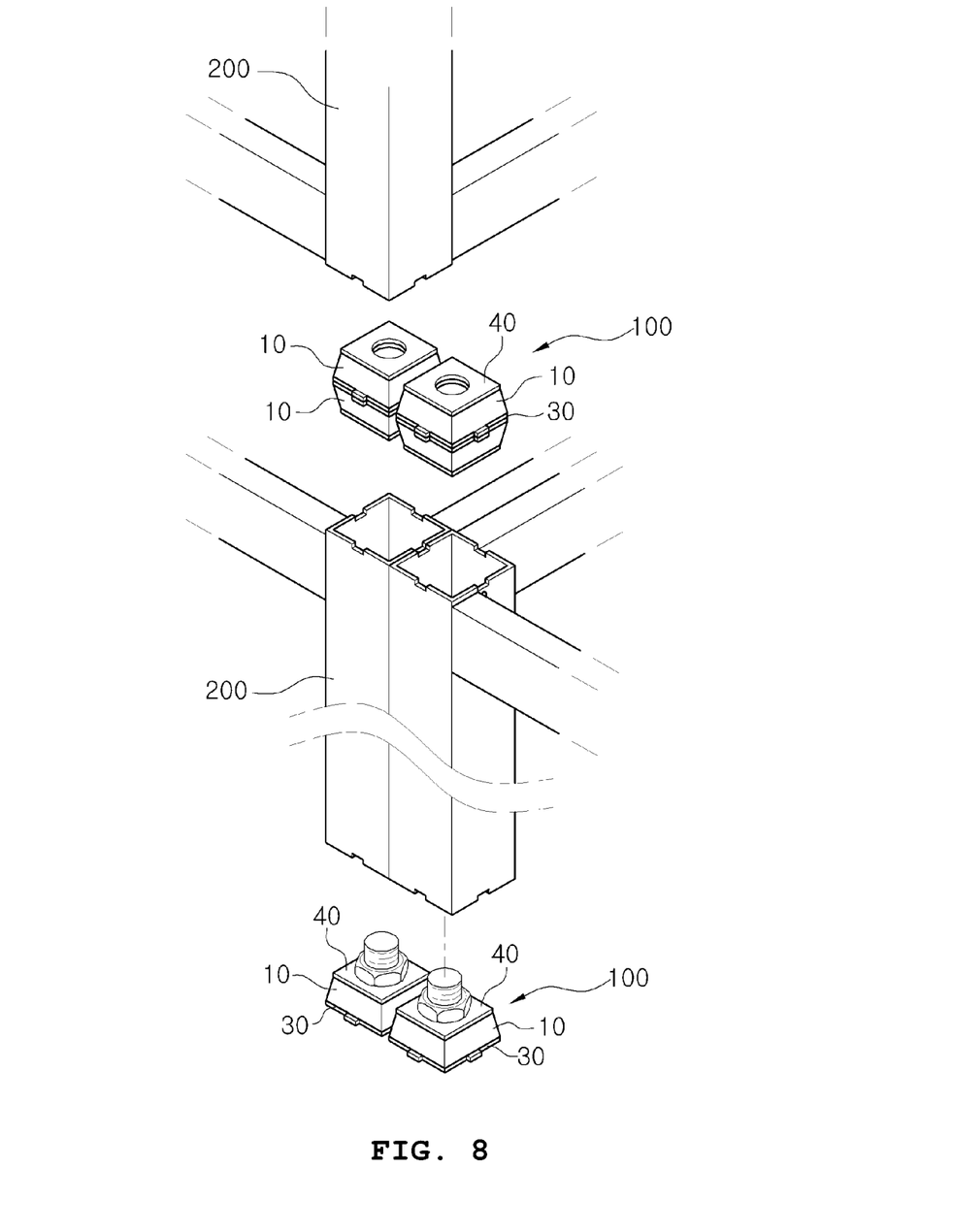
FIG. 8 is an exploded perspective view illustrating the state in which a pair of coupling blocks laterally coupled to each other is installed in frames according to the embodiment of the present invention.

FIG. 8 is an exploded perspective view illustrating the state in which the coupling blocks are coupled to the frames according to the embodiment of the present invention. As illustrated in FIG. 8, the frames 200 may be fixed using the coupling blocks 100.

Here, after an anchor bolt installed in the ground is inserted into the first through-hole 11 of the body 10, a frame 200 is coupled to the upper portion of the body 10 so as to be fixed on the ground, thereby preventing the frame 200 from being arbitrarily decoupled from the ground.

Accordingly, the coupling block 100 is installed at a position for fixing the frame 200 on the ground.

The fixed lower frame 200 and a stacked upper frame 200 are fixedly coupled to the respective upper and lower portions of the pair of vertical coupling blocks 100.

In addition, the vibration-proof pads 40 on the upper portions of the bodies 10 absorb shocks and load transferred from the frames 200.

Finally, the bodies 10, which are laterally coupled to the pair of vertical coupling blocks, are respectively coupled to frames 200, which are laterally formed, so as to fix the lateral frames 200.

Accordingly, the coupling blocks 100 are laterally coupled to each other by the coupling portions 32 so as to fix the frames 200.

In addition, when the frame 200 extends laterally, the coupling block 100 extends laterally. In this case, after the coupling block 100 is inserted into a frame 200, which is laterally formed, so as to fix the frame 200, the frame 200 is vertically stacked.

Thus, the coupling blocks 100 may be individually used or be coupled to each other in various manners.

That is, the coupling blocks 100 are coupled to the ground or the frames 200 so as to extend and fix other frames 200 which are vertically stacked.

In addition, since the fixing plate 30 is detachably coupled to the coupling block 100, the fixing plate 30 may be changed to match the size of the frame 200.

The frame 200 is formed with fitting grooves 210 for coupling with the fixing protrusions 31 formed on the side of the fixing plate 30, and the fixing protrusions 31 may be inserted into the fitting grooves 210.

Thus, the body 10 is coupled to the end of the frame 200 by the fixing protrusions 31, thereby preventing them from being decoupled from each other.

When the body 10 is coupled into the frame 200, a fastening member is coupled to a fixing groove 12 through an elongate groove 220 in order to prevent the body 10 and the frame 200 from being arbitrarily decoupled from each other.

Second Embodiment

Figure 9:
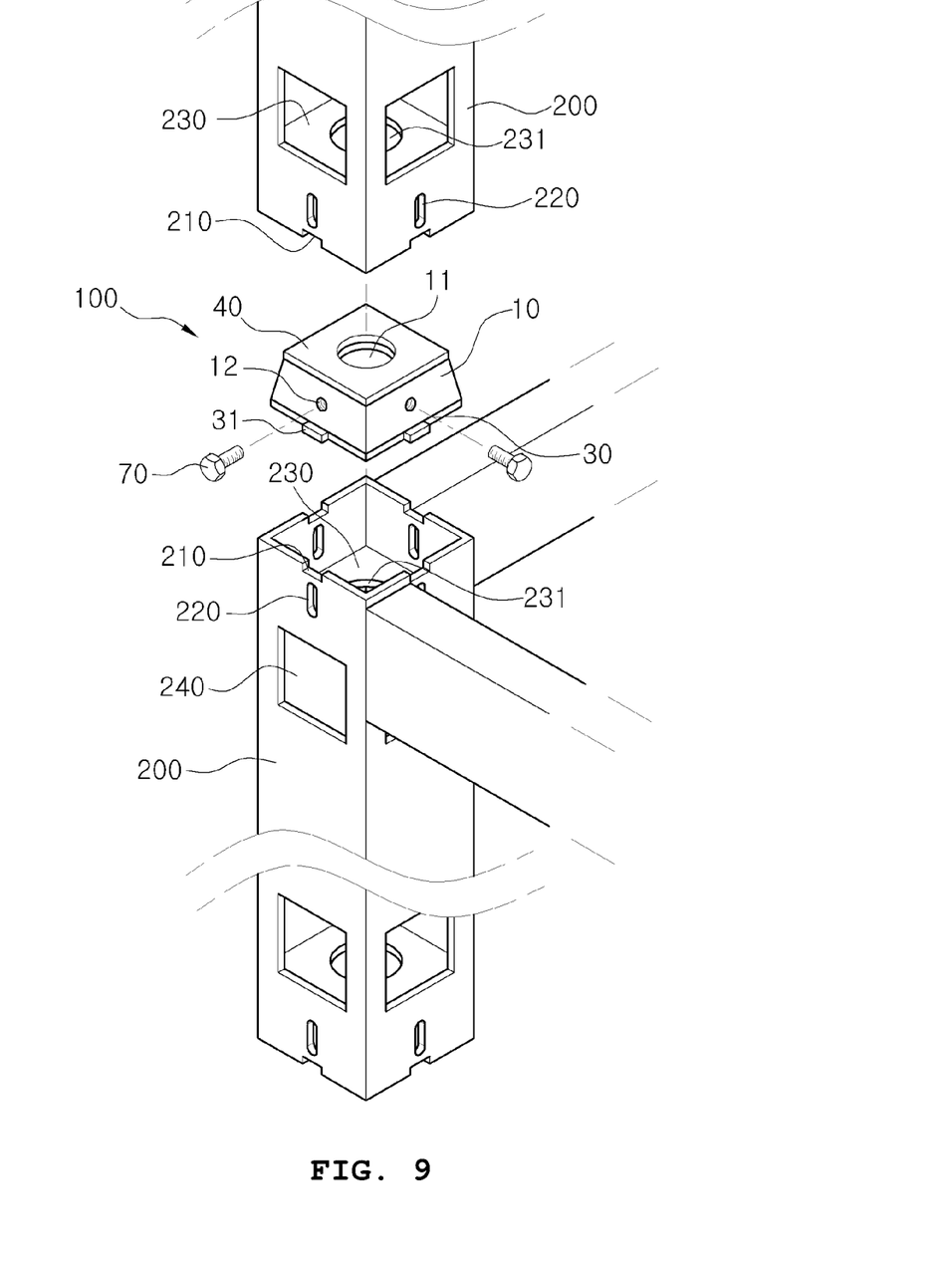
FIG. 9 is an exploded perspective view illustrating the state in which one coupling block of a building assembly structure is coupled to a frame according to a second embodiment of the present invention.
Figure 10:
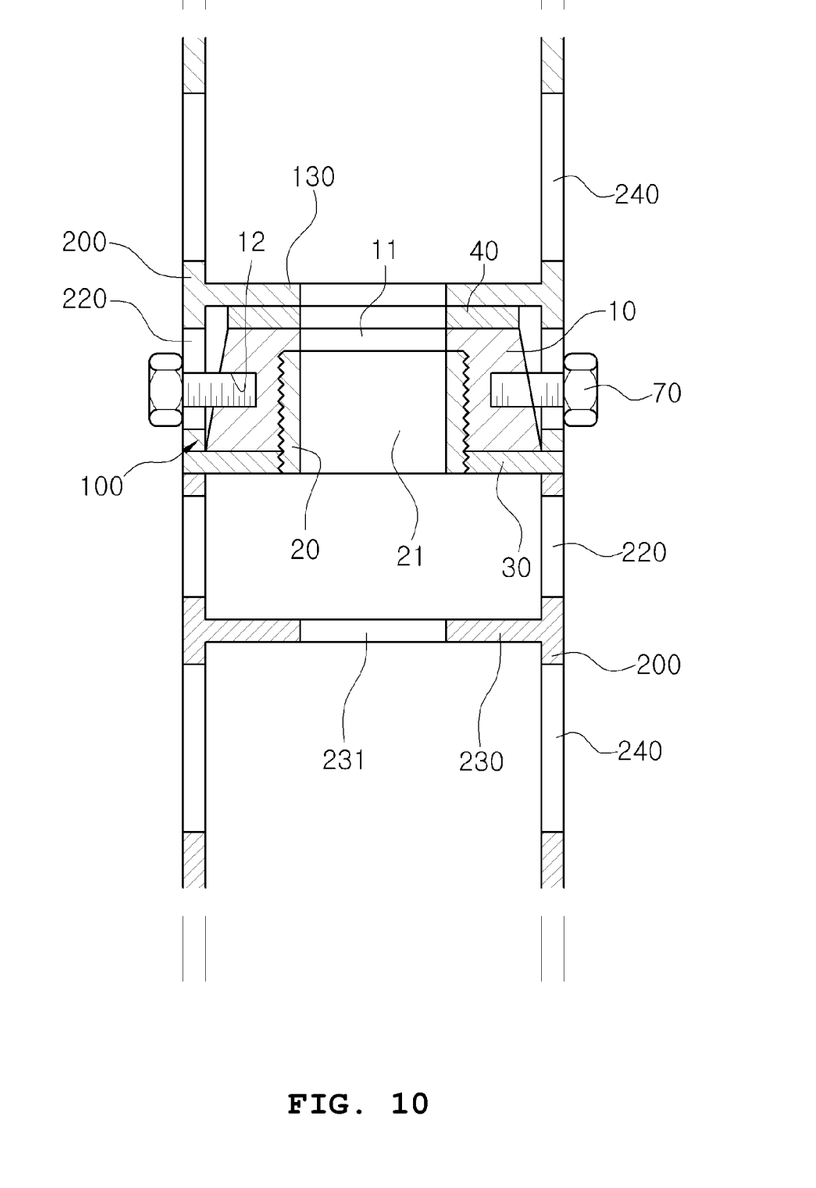
FIG. 10 is a cross-sectional view illustrating the state in which the coupling block is coupled to the frame according to the embodiment of the present invention.

FIG. 9 is an exploded perspective view illustrating the state in which one coupling block of a building assembly structure is coupled to a frame according to a second embodiment of the present invention. FIG. 10 is a cross-sectional view illustrating the state in which the coupling block is coupled to the frame according to the embodiment of the present invention.

As illustrated in FIGS. 9 and 10, the second embodiment includes the configuration of the first embodiment, and there is further provided a frame 200 which has a fitting groove 210 formed at the end thereof in the second embodiment.

Accordingly, the fitting groove 210 consists of a plurality of fitting grooves formed at the end of the frame 200.

Here, the frame 200 is manufactured to form the basic shape of a building by welding, screwing, riveting, etc., and is then used to construct facilities such as walls and ceilings.

That is, the coupling block 100 is fixed on the ground or to the fitting grooves 210, and another frame 200 is inserted into the upper portion of the coupling block 100.

Here, the fixing protrusions 31 are preferably coupled into the fitting grooves 210.

The frame 200 has an elongate groove 220 formed on the side thereof, and the body 10 has a fixing groove 12 formed on the side thereof. The building assembly structure includes a second fixing member 70, which is fixed into the fixing groove 12 through the elongate groove 220, so as to fix the body 10.

Here, the elongate groove 220 is preferably formed at a position corresponding to the fixing groove 12 formed on the side of the coupling block 100 which is coupled to the frame 200.

Preferably, the second fixing member 70 consists of a pin, a screw, or a shaft which is coupled to the fixing groove 12 through the elongate groove 220, so as to fix the body 10.

Accordingly, the fixing groove 12 preferably consists of a plurality of fixing grooves to fix the coupling block 100.

Thus, since the coupling block 100 is fixed by the second fixing member 70, the second fixing member 70 prevents the coupling block 100 from being arbitrarily decoupled from the frame 200.

The frame 200 has a seating plate 230 coupled therein, the seating plate 230 has a fourth through-hole 231 formed therein, the body 10 inserted into the frame is seated to the seating plate 230, and the frame 200 has an opening portion 240 formed on the side thereof so that the lower portion of the seating plate 230 is opened through the opening portion 240.

The opening portion 240 is formed below the seating plate 230 so as to open the internal portion of the frame, and enables the coupling block 100 to be fastened to the frame 200 by screws, pins, shafts, or the like.

In addition, after the assembly work is completed, wires, water pipes, and the like may be inserted and installed in the frame by removing the screws.

Consequently, since the coupling block 100 is fixedly coupled into the fitting groove 210 of the frame 200, it is possible to easily install the coupling block 100 and to prevent the arbitrary decoupling and twisting of the coupling block 100 using the elongate groove 220 and the seating plate 230.

In addition, since the frame 200 is opened through the fourth through-hole 231, it is possible to easily perform installation work such as coupling, piping, and wiring in the frame 200.

Various embodiments have been described in the best mode for carrying out the invention. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A building assembly structure comprising:
   a coupling block fixed on the ground or to a frame so as to fix and extend the frame, wherein the coupling block comprises:
   a body having a first through-hole passing through upper and lower portions thereof;
   a connection member coupled to a lower portion of the first through-hole, and having a second through-hole formed therein, wherein the connection member has a cut portion formed on an outer peripheral surface thereof;
   a fixing plate coupled to the connection member so as to be located on the lower portion of the body, and having a fixing protrusion protruding from a side thereof;
   a vibration-proof pad coupled to the upper portion of the body in order to absorb load and shocks applied from above;
   a bracket installed so as to be vertically movable along the outer peripheral surface of the connection member, and protruding to an upper portion of the vibration-proof pad;
   a shock absorption plate coupled to an upper end of the bracket, and located on the upper portion of the vibration-proof pad; and
   a buffer member inserted into the cut portion so as to absorb shocks when the bracket moves vertically.

2. The building assembly structure according to claim 1, wherein the coupling block consists of a pair of coupling blocks that are vertically coupled to each other by a first fixing member coupled to lower portions of the respective connection members thereof.

3. The building assembly structure according to claim 1, wherein the coupling block consists of a plurality of coupling blocks that are laterally coupled to each other through a coupling portion corresponding to the fixing protrusion formed on the fixing plate.

4. A building assembly structure comprising:
a coupling block coupled to a frame having a fitting groove formed at an end thereof, so as to fix and extend the frame, wherein the coupling block comprises:
a body inserted into the end of the frame, and having a first through-hole passing through upper and lower portions thereof;
a connection member coupled to a lower portion of the first through-hole, and having a second through-hole formed therein, wherein the connection member has a cut portion formed on an outer peripheral surface thereof;
a fixing plate coupled to the connection member so as to be located on the lower portion of the body, and having a fixing protrusion formed on a side thereof, the fixing protrusion being coupled into the fitting groove; and
a vibration-proof pad coupled to the upper portion of the body in order to absorb load and shocks applied from above;
a bracket installed so as to be vertically movable along the outer peripheral surface of the connection member, and protruding to an upper portion of the vibration-proof pad;
a shock absorption plate coupled to an upper end of the bracket, and located on the upper portion of the vibration-proof pad; and
a buffer member inserted into the cut portion so as to absorb shocks when the bracket moves vertically,
wherein the coupling block is coupled to the frame through the fitting groove formed at the end of the frame and an elongate groove formed in a side of the frame, and
wherein the building assembly structure comprises a second fixing member fixed into a fixing groove formed in a side of the body through the elongate groove so as to fix the coupling block.

5. The building assembly structure according to claim 4, wherein the coupling block consists of a pair of coupling blocks that are vertically coupled to each other by a first fixing member coupled to lower portions of the respective connection members thereof.

6. The building assembly structure according to claim 4, wherein:
the frame has a seating plate coupled therein, the seating plate has a fourth through-hole formed therein, and the coupling block inserted into the frame is seated to the seating plate; and
the frame has an opening portion formed on the side thereof in order to open a lower portion of the seating plate.

7. The building assembly structure according to claim 4, wherein the coupling block consists of a plurality of coupling blocks that are laterally coupled to each other through a coupling portion corresponding to the fixing protrusion formed on the fixing plate.

* * * * *